United States Patent
Vissenberg et al.

(10) Patent No.: US 8,129,731 B2
(45) Date of Patent: Mar. 6, 2012

(54) LIGHT EMITTING DIODE LIGHTING DEVICE

(75) Inventors: Michel Cornelis Josephus Marie Vissenberg, Eindhoven (NL); Willem Lubertus Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 223 days.

(21) Appl. No.: 12/445,337

(22) PCT Filed: Oct. 12, 2007

(86) PCT No.: PCT/IB2007/054164
§ 371 (c)(1),
(2), (4) Date: Apr. 13, 2009

(87) PCT Pub. No.: WO2008/047283
PCT Pub. Date: Apr. 24, 2008

(65) Prior Publication Data
US 2010/0065860 A1  Mar. 18, 2010

(30) Foreign Application Priority Data
Oct. 16, 2006  (EP) .................................... 06122321

(51) Int. Cl.
*H01L 33/00* (2010.01)
(52) U.S. Cl. ............. 257/88; 257/98; 362/235; 362/612
(58) Field of Classification Search ............... 257/98; 362/235, 612
See application file for complete search history.

(56) References Cited

U.S. PATENT DOCUMENTS

| | | | |
|---|---|---|---|
| 7,980,747 B2 * | 7/2011 | Vissenberg et al. | 362/612 |
| 8,047,696 B2 * | 11/2011 | Ijzerman et al. | 362/609 |
| 2004/0141302 A1 | 7/2004 | Koch et al. | |
| 2004/0174706 A1 | 9/2004 | Kan | |
| 2005/0094392 A1 | 5/2005 | Mooney | |
| 2006/0104594 A1 | 5/2006 | Waring | |
| 2006/0221638 A1 | 10/2006 | Chew et al. | |
| 2010/0053955 A1 * | 3/2010 | Vissenberg et al. | 362/235 |
| 2010/0109576 A1 * | 5/2010 | Ijzerman et al. | 315/312 |

FOREIGN PATENT DOCUMENTS

| | | |
|---|---|---|
| JP | 09186825 A | 7/1997 |
| JP | 2004206916 A | 7/2004 |
| WO | 2006016327 A2 | 2/2006 |
| WO | 2006033032 A1 | 3/2006 |

* cited by examiner

*Primary Examiner* — Thien F Tran
(74) *Attorney, Agent, or Firm* — Mark L. Beloborodov

(57) ABSTRACT

The present invention relates to a light emitting diode (LED) lighting device (10). The lighting device comprises a light guide plate (12), and a plurality of LEDs (16) accommodated in holes (14) arranged in the plane of the light guide. At least one hole has a first side facet (18) for coupling light from any LED in the hole into the light guide and a second opposite side facet (20) for coupling light out of the light guide. Further, the holes are arranged such that all first side facets are facing one direction. Such an LED based lighting device can be made thin and unobtrusive.

15 Claims, 3 Drawing Sheets

LIGHT EMITTING DIODE LIGHTING DEVICE

FIELD OF THE INVENTION

The present invention relates to a lighting device comprising a plurality of light emitting diodes.

BACKGROUND OF THE INVENTION

There is currently an increasing need to integrate lighting devices in interiors as unobtrusively as possible. This enables architects and interior designers to create a style that clearly distinguishes one building or interior from another.

At the same time, lighting devices based on light emitting diodes (LEDs) are expected to replace traditional fluorescent lighting fixtures, due to the LEDs superior properties when it comes to power consumption, endurance, size, etc.

However, existing LED based lighting devices are typically too thick due to heat management problems (large cooling systems are needed) and the optical system used (usually a diffuser placed at a certain distance from the LEDs or a bulky diffuser placed on top of the LEDs). Also, existing LED lighting devices are mostly non-transparent. Overall, existing LED lighting devices are typically not very unobtrusive.

SUMMARY OF THE INVENTION

It is an object of the present invention to overcome these problems, and to provide an improved lighting device, which lighting device in particular can be made thin and unobtrusive.

These and other objects that will be apparent from the following description are achieved by means of a lighting device comprising a light guide plate and a plurality of LEDs accommodated in holes arranged in the plane of the light guide, wherein at least one hole has a first side facet for coupling light from any LED in the hole into the light guide and a second opposite side facet for coupling light out of the light guide, and wherein the holes are arranged such that all first side facets are facing one direction.

Preferably, the second out-coupling facets are reflective and tilted in relation to the plane of the light guide. The tilted reflective element may for example be a bare facet followed by an air slit and a reflector, all arranged at about 45 degrees in relation to the plane of the light guide, in which case light is coupled out of the light guide in a direction along the normal of the light guide plate.

Also preferably, the sidewalls of the holes between the first and second opposite facets are adapted to reflect any incoming light, for instance by means of total internal reflection (TIR).

Thus, the light from a given LED cannot penetrate another hole, since the first in-coupling facets are at the shadow side, the second out-coupling facets are reflective, and the remaining sides reflect all light by TIR. Hence, no light will be lost due to absorption or scattering at the other light sources of the lighting device, which ensures good light efficiency. Furthermore, the thickness of the light guide (and hence the lighting device) can be very small, preferably about 3 mm or less, mainly limited by the thickness of the LEDs themselves. Also, since only the LEDs and the second out-coupling facets have to be non-transparent, a significant area of the lighting device can be transparent, which makes it easier for the lighting device to harmonize with the surroundings when it is turned off. The transparent property may further be enhanced by placing the LEDs partly under the tilted reflective out-coupling facets.

Preferably, the holes are arranged in the plane of the light guide according to a staggered distribution. More preferably, the holes are arranged such that light in-coupled from a row of holes will not hit the second out-coupling facets of the next row of holes. This allows improvement of the light mixing properties of the lighting device. The light mixing in the light guide according to the present invention makes the lighting device robust for flux and color differences between the LEDs and also for failure of a few LEDs per $m^2$.

In order to fulfill anti-glare requirements, for example in case the lighting device is used as an indoor office lighting, the light of the lighting device is preferably collimated. According to one embodiment, this can be achieved by providing one collimator per LED. For instance, at least one LED can comprise a collimator. The collimator may for example be a reflecting cup into which the LED die is placed, or TIR optics placed on the LED die. Alternatively, or as a complement, at least one hole may have an integrated collimator. For example, a tapered block of light guide material forming an integral part of the light guide can be used as a TIR collimator. The collimator integrated with the LED or hole can be used to collimate light in both the horizontal direction (in the plane of the light guide) and the vertical direction (perpendicular to the plane of the light guide).

In another embodiment, at least one hole has a trapezium shape for collimating light in the horizontal direction (in the plane of the light guide). In an alternative or a complementary embodiment, the light guide may have a wedge shape for collimating light in the vertical direction. An advantage with these two latter embodiments is that light will be more and more collimated as it travels through the light guide, thus increasing the overall collimation.

The above embodiments for providing collimation can also be combined to achieve a desired collimation. Overall, by mixing and collimating the light in the plane of the light guide plate (instead of in the direction of the light that leaves the lighting fixture, which would require a thicker system), a very thin lighting device can be achieved.

BRIEF DESCRIPTION OF THE DRAWINGS

This and other aspects of the present invention will now be described in more detail, with reference to the appended drawings showing currently preferred embodiments of the invention.

DETAILED DESCRIPTION

Figure 1A:
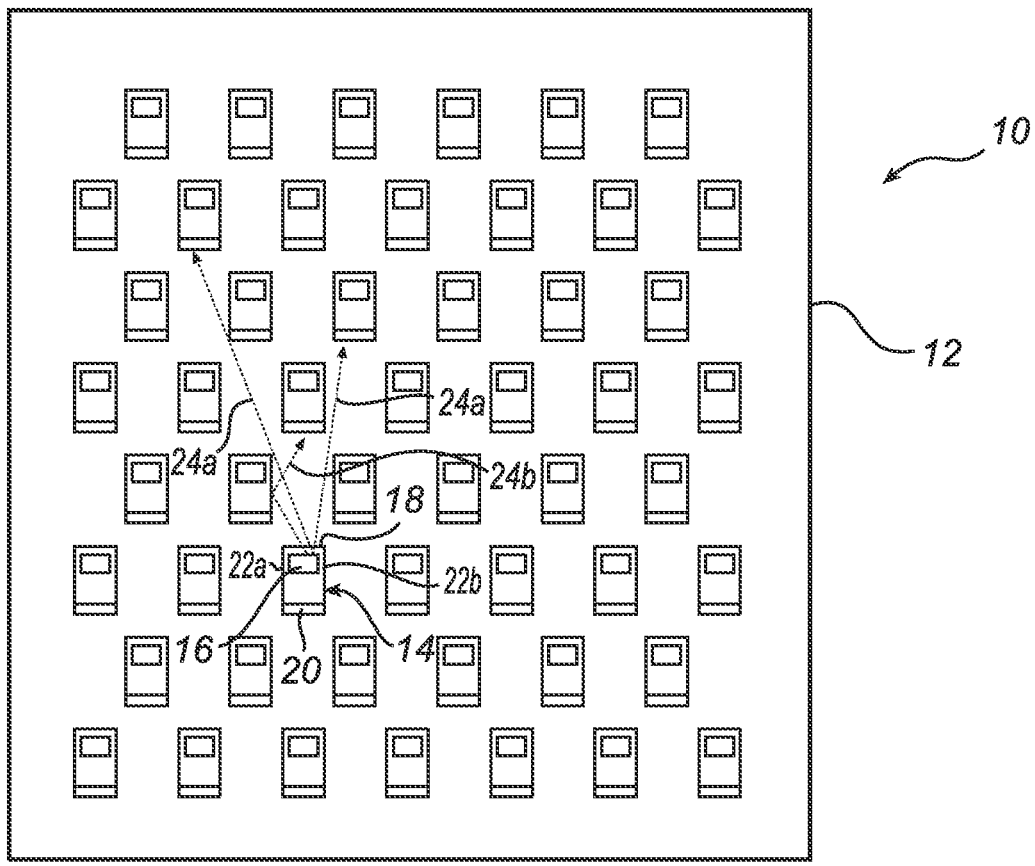
FIG. 1a is a top view of a lighting device according to a basic embodiment of the invention.

A lighting device according to a basic embodiment of the present invention will now be described in relation to FIGS.

1a-1b. The lighting device denoted 10 comprises a transparent light guide plate 12. One side of the light guide 12 is provided with a plurality of holes 14, each accommodating a light emitting diode (LED) 16. The holes 14 can be a hole through the whole thickness of the light guide 12 or a hole at one side of the light guide 12. The LEDs 16 can be side emitting LEDs or top-emitting LEDs tilted about 90 degrees. Further, the LEDs 16 are preferably low power LEDs, in the order of 60 mW, for lowering the overall power consumption of the lighting device 10. Also, such LEDs do not generate very much heat, avoiding the need for heat management means such as a heat sink. Also, such LEDs are usually smaller, which allows for a thinner lighting device 10.

In a typical implementation, the thickness of the light guide 12 is about 1.2 mm, the base area of the holes 14 is about 2.8-3.5×5.5 mm, and the LEDs 16 are about 0.8 mm in height and 2.8 mm in width. About one LED 16 is provided per $cm^2$ of the light guide 12. It should be noted that improvements in LED efficiency, and/or the use of higher-power LEDs, will allow for larger LED spacing, while keeping the light output of the lighting device the same.

Each hole 14 has a first in-coupling side facet 18, for coupling light from the LED 16 in the hole 14 into the light guide 12. At the opposite side of each hole 14, there is provided a second out-coupling side facet 20, for coupling light out of the light guide 12. Preferably, the out-coupling facet 20 is bare facet followed by an air slit and a mirror arranged at about 45 degrees in relation to the plane of the light guide plate 12, in which case light is coupled out of the light guide 12 in a direction along the normal of the light guide 12, as can be seen in FIG. 1b. A large part of the incoming light will be reflected by means of total internal reflection (TIR) at the bare facet without losses. The remaining light is reflected by the mirror behind the TIR facet to avoid light entering the next hole. The out-coupling facets 20 can out-couple the light to either side of the light guide 12, or both sides, depending on the application. The remaining side walls 22a, 22b of each hole 14 between the in-coupling facet 18 and the opposite out-coupling facet 20 are adapted to reflect any incoming light, for instance by means of TIR. TIR can be achieved by orientating the sidewalls 22 appropriately, parallel to the average direction of the light. Optionally, the side of the light guide 12 with the open holes 14 may be covered by a transparent plate (not shown), to avoid collection of dust or the like in the holes 14.

Figure 1B:
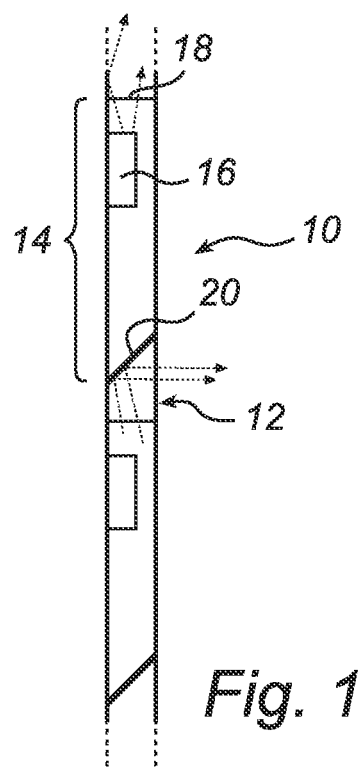
FIG. 1b is an enlarged cross-sectional side view of a section of the lighting device in FIG. 1a, FIG. 2a is a top view of a lighting device according to an embodiment of the invention with one collimator per LED.

The holes 14 are further arranged such that all in-coupling side facets 18 are facing one direction ("upwards" in FIG. 1a). Consequently, all apposite out-coupling side facets 20 are facing the opposite direction ("downwards" in FIG. 1a).

During operation of the lighting device 10, light emitted by one LED 16 is coupled into the light guide 12 via the in-coupling side facet 18 of the hole 14 where the one LED 16 is accommodated. The light is then coupled out of the light guide 12 via the out-coupling side facet 20 of some other hole 14, either directly (as indicated by exemplary ray-traces 24a) or after being reflected by the sidewall 22 of at least one other hole 14 (as indicated by exemplary ray-trace 24b).

Thus, the light from a given LED 16 will not penetrate another hole 14, since the in-coupling side facets 18 are at the shadow side, the out-coupling side facets 20 are reflective and the remaining sidewalls 22 reflect all light by TIR. Hence, no light will be lost due to absorption or scattering at the other light sources of the lighting device 10, which ensures good light efficiency. Furthermore, the thickness of the light guide 12 (and hence the lighting device 10) can be very small, mainly limited by the thickness of the LEDs 16 themselves.

The degree of light mixing in the lighting device 10 is controlled, among other things, by the distance between the holes 14, i.e. the hole density. As illustrated in FIG. 1a, light entering the light guide 12 at a given position can exit the light guide 12 at various out-coupling side facets 20. If there is a high hole density (i.e. short distances between the holes 14), most of the light from a given LED 16 will be out-coupled through the out-coupling side facet 20 (of another hole 14) opposite the in-coupling side facet 18 of the given LED 16. On the other hand, if the hole density is low (i.e. long distances between the holes 14), the light from a given LED 16 will spread out to many out-coupling side facets 20 and the light from many LEDs 16 will be mixed before it leaves the light guide 12.

Further, the light mixing properties can be improved by arranging the holes 14 according to a staggered distribution, as illustrated in FIG. 1a. The light exiting may have a limited angle of departure range, whereby the light will not hit the most adjacent row of out-coupling side facets 20 if these are outside the range. Instead, the light is forced to travel further in the light guide 12 before it is coupled out, resulting in more mixing in the plane of the light guide 12. For example, if the angle of departure range is about 80 degrees centered, any out-coupling side facet 20 at 45 degrees (as in the staggered distribution in FIG. 1a) will be "invisible". The angle of departure range is for example determined by the refractive index of the material of the light guide 12, by the emission pattern of the LED, and/or by the collimator in the hole (if present).

Figure 2A:
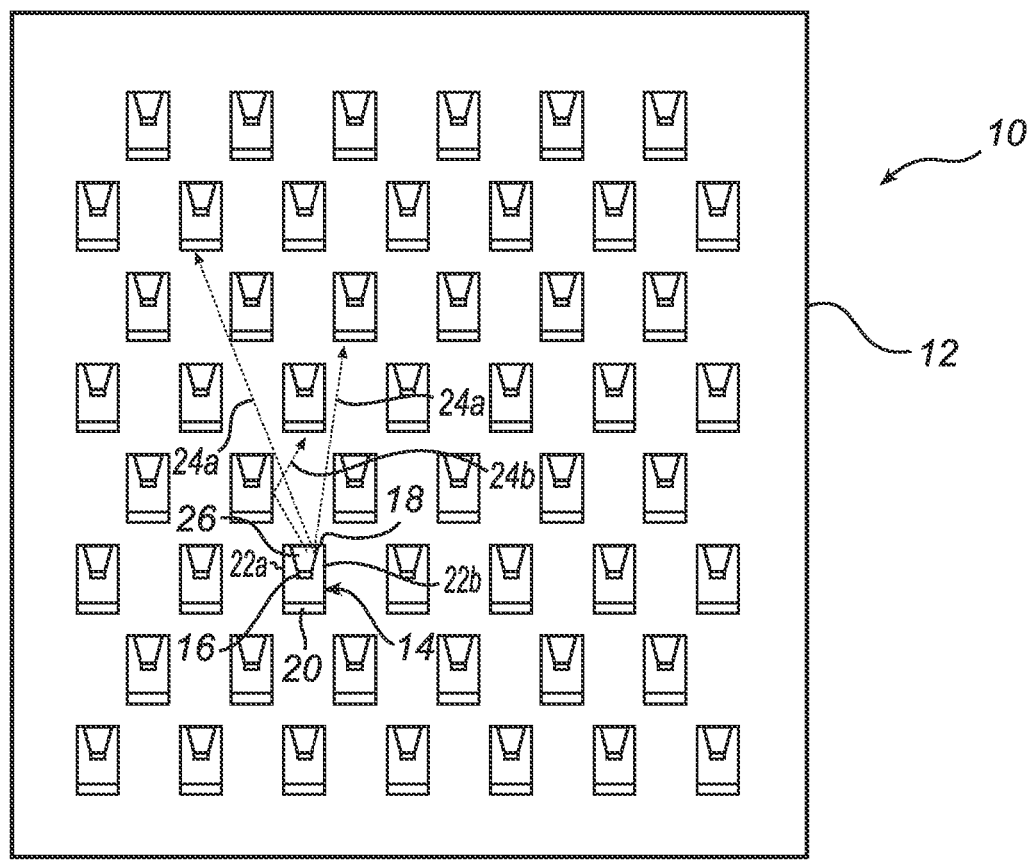
FIG. 2b is an enlarged perspective view of an exemplary collimator of FIG. 2a, FIG. 3a is a top view of a lighting device according to an embodiment of the invention with trapezium shaped holes.
Figure 2B:
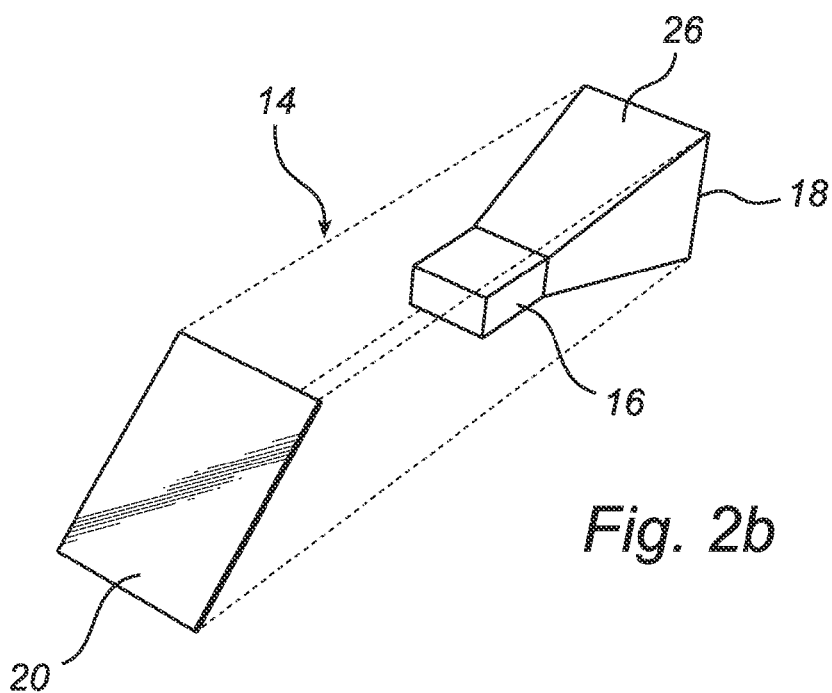

In order to comply with anti-glare requirements of the lighting device 10 (i.e. the light out-coupled from the light guide should not have a too large angle of departure), the light of the lighting device 10 is preferably collimated. According to one embodiment, this can be achieved by providing one dedicated collimator per LED. An exemplary collimator 26 illustrated in FIGS. 2a-2b is a TIR collimator made of a block of light guide material forming an integral part of the light guide. The exemplary collimator 26 is tapered so as to collimate light in both the horizontal direction (in the plane of the light guide 12) and the vertical direction (perpendicular to the plane of the light guide 12). Namely, the collimator 26 becomes wider and thicker closer to the in-coupling facet 18. However, a collimator tapered in one direction only is also envisaged. The light is collimated before exiting the holes 14. At the in-coupling facet 18, the collimator 26 is preferably in optical contact with the light guide 12. Alternatively, or as a complement, the collimator may be integrated with the LED. For example, it can be a reflecting cup into which the die of the LED is placed or a TIR optics placed on the die of the LED. The collimator comprised in the LED can also be used to collimate light in both the horizontal direction and the vertical direction or in one direction only.

Figure 3A:
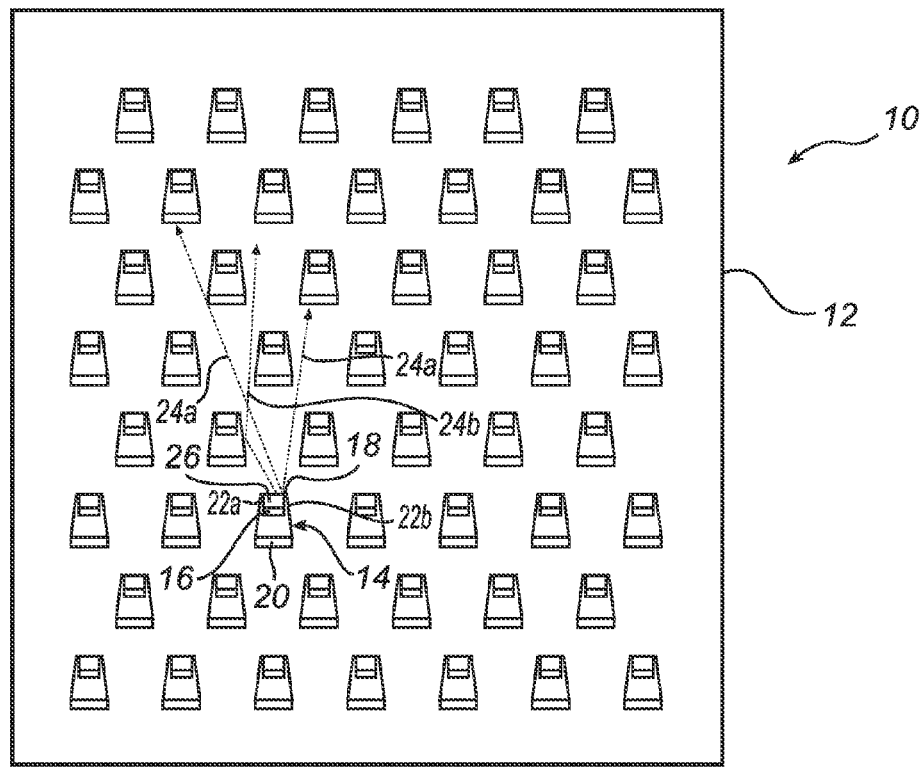
FIG. 3b is an enlarged perspective view of an exemplary collimator of FIG. 3a, and FIG. 4 is a cross-sectional side view of a lighting device according to an embodiment of the invention with a light guide having a recurring wedge shape.
Figure 3B:
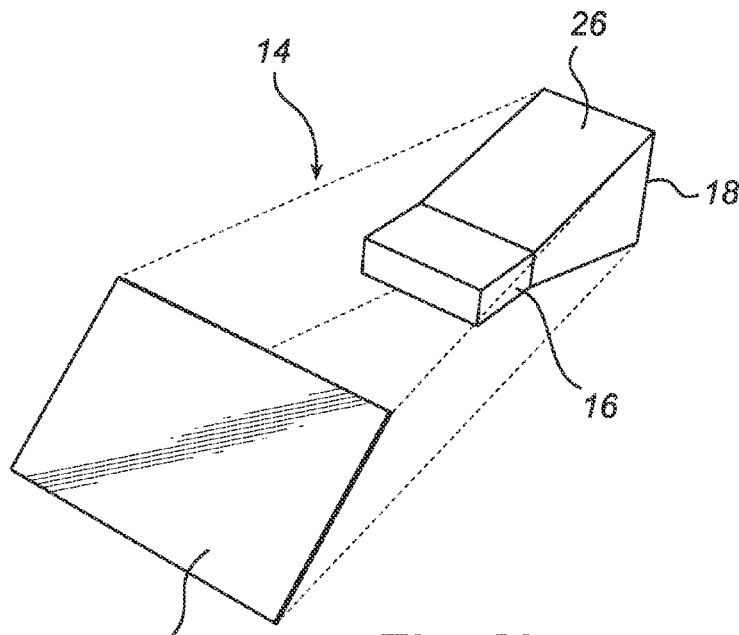

In another embodiment illustrated in FIG. 3a, the holes 14 may have a trapezium shape for collimating light outside the holes 14 in the horizontal direction. Namely, the width of the hole tapers towards the in-coupling side facet 18, causing the sidewalls 22 to be slanted. As a result, light reflected by the slanted side walls 22 becomes more collimated in the horizontal direction as it travels through the light guide 12, compared to a case with non-slanting side walls 22 (as in FIG. 1a). An advantage with this embodiment is that light that travels further in the light guide 12 will have more interaction with the collimating sidewalls 22. Consequently, the light will be more collimated compared to the above alternatives where the light has interaction with only one collimator 26. It should also be noted that the slanted sidewalls 22 may be curved instead of straight (as in FIG. 3a) to provide an even better collimation. The trapezium holes are preferably combined with individual collimators 26 integrated in each hole and tapered so as to collimate light in the vertical direction only (FIG. 3b), resulting in overall collimation in both the vertical and horizontal directions.

Figure 4:
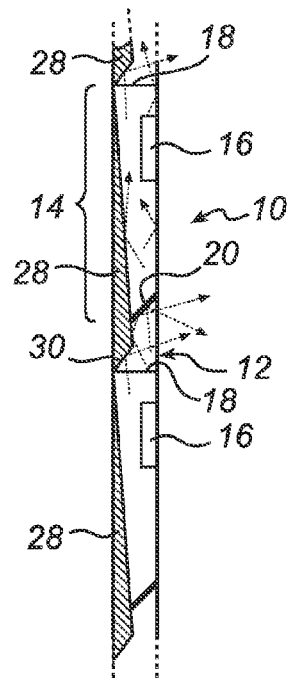

In an alternative or complementary embodiment, the light guide may have a wedge shape 26 for collimating light in the vertical direction, as illustrated in FIG. 4. Namely, the wedge shape 28 of the light guide 12 becomes thinner in the direction in which the in-coupling side facets 18 are facing, creating a "sloping" surface in the light guide 12. As a result, light reflected by the wedge shape 28 becomes more collimated in the vertical direction as it travels through the light guide 12, compared to a case without the wedge shape 28 (as in FIG. 1b). To keep a constant thickness of the light guide, the wedge shape 28 is preferably recurring, and reflecting out-coupling edges 30 (at about 45 degrees) are provided at the high end of each wedge shape 28.

In the device of FIGS. 3 and 4, the holes are preferably through holes, to avoid any light from circumventing the collimation structures of the holes. When collimators are used inside the holes only (as in FIG. 2), the holes do not have to be through holes.

Applications for the LED lighting device according to the present invention include indoor lighting such as office lighting or atmospheric or decorative lighting, outdoor lighting such as illumination of buildings, signs, etc.

The person skilled in the art realizes that the present invention by no means is limited to the preferred embodiments described above. On the contrary, many modifications and variations are possible within the scope of the appended claims. For example, the above means for providing collimation as illustrated in FIGS. 2-4 can be combined in various ways to achieve a desired collimation. Also, not every hole have to contain an LED, some holes may for example only be used for out-coupling of light. Also, a hole not used for in-coupling of light may have a triangular shape rather than the trapezoid shape, since it needs no in-coupling facet. Also, the LED lighting device according to the invention is suitably and advantageously a cut to measure lighting device, so that a lighting device having a desired shape and size can be cut out of a larger lighting device. In such a cut to measure device, the LEDs are preferably connected in parallel.

The invention claimed is:

1. A light emitting diode (LED) lighting device, comprising:
   a light guide plate, and
   a plurality of LEDs accommodated in holes arranged in the plane of the light guide, wherein at least one hole has a first side facet for coupling light from any LED in the hole into the light guide and a second opposite side facet for coupling light out of the light guide, and wherein the holes are arranged such that all first side facets are facing one direction, wherein the holes are arranged in the plane of the light guide according to a staggered distribution.

2. A device according to claim 1, wherein at least one second opposite side facet is reflective and tilted in relation to the plane of the light guide.

3. A device according to claim 1, wherein side walls of the holes between the first and second opposite side facets are adapted to reflect any incoming light.

4. A device according to claim 1, wherein the light guide has a thickness of about 3 mm or less.

5. A device according to claim 1, wherein the holes are arranged in the staggered formation including a first row and a second row adjacent to the first row such that light in-coupled from the first row of holes does not hit the second opposite side facet of the at least one hole in the second row of holes.

6. A device according to claim 1, wherein at least one LED comprises a collimator.

7. A device according to claim 1, wherein at least one hole has an integrated collimator.

8. A light emitting diode (LED) lighting device, comprising:
   a light guide plate, and
   a plurality of LEDs accommodated in holes arranged in the plane of the light guide, wherein at least one hole has a first side facet for coupling light from any LED in the hole into the light guide and a second opposite side facet for coupling light out of the light guide, and wherein the holes are arranged such that all first side facets are facing one direction, wherein at least one LED comprises a collimator.

9. A device according to claim 8, wherein at least one second opposite side facet is reflective and tilted in relation to the plane of the light guide.

10. A device according to claim 8, wherein side walls of the holes between the first and second opposite side facets are adapted to reflect any incoming light.

11. A device according to claim 8, wherein the light guide has a thickness of about 3 mm or less.

12. A light emitting diode (LED) lighting device, comprising:
    a light guide plate, and
    a plurality of LEDs accommodated in holes arranged in the plane of the light guide, wherein at least one hole has a first side facet for coupling light from any LED in the hole into the light guide and a second opposite side facet for coupling light out of the light guide, and wherein the holes are arranged such that all first side facets are facing one direction, wherein at least one hole has an integrated collimator.

13. A device according to claim 12, wherein at least one second opposite side facet is reflective and tilted in relation to the plane of the light guide.

14. A device according to claim 12, wherein side walls of the holes between the first and second opposite side facets are adapted to reflect any incoming light.

15. A device according to claim 12, wherein the light guide has a thickness of about 3 mm or less.

* * * * *